US012777318B2

(12) United States Patent
Yu et al.

(10) Patent No.: US 12,777,318 B2
(45) Date of Patent: Oct. 27, 2026

(54) SEAMLESS ROAMING MECHANISM FOR WIRELESS NETWORKS

(71) Applicant: NEWRACOM, Inc., Irvine, CA (US)

(72) Inventors: Heejung Yu, Daejeon (KR); Joonsoo Lee, Seoul (KR); Si-Chan Noh, Seoul (KR); Il-Gu Lee, Seoul (KR)

(73) Assignee: NEWRACOM, Inc., Irvine, CA (US)

( * ) Notice: Subject to any disclaimer, the term of this patent is extended or adjusted under 35 U.S.C. 154(b) by 250 days.

(21) Appl. No.: 18/746,774

(22) Filed: Jun. 18, 2024

(65) Prior Publication Data

US 2025/0016542 A1 Jan. 9, 2025

Related U.S. Application Data

(60) Provisional application No. 63/511,777, filed on Jul. 3, 2023.

(51) Int. Cl.
*H04W 8/14* (2009.01)
*H04L 1/1607* (2023.01)

(52) U.S. Cl.
CPC ............ *H04W 8/14* (2013.01); *H04L 1/1607* (2013.01)

(58) Field of Classification Search
None
See application file for complete search history.

(56) References Cited

U.S. PATENT DOCUMENTS

| | | | | |
|---|---|---|---|---|
| 10,244,464 | B2 * | 3/2019 | Jabbar | H04W 24/02 |
| 2008/0075035 | A1 * | 3/2008 | Eichenberger | H04W 36/0085 370/328 |
| 2018/0132170 | A1 * | 5/2018 | Jabbar | H04W 48/18 |
| 2022/0225200 | A1 * | 7/2022 | Smith | H04L 1/1614 |
| 2024/0305969 | A1 * | 9/2024 | Cariou | H04W 8/02 |
| 2024/0389140 | A1 * | 11/2024 | Cherian | H04W 74/0808 |

OTHER PUBLICATIONS

IEEE 802.11-2020: "Part 11: Wireless LAN Medium Access Control (MAC) and Physical Layer (PHY) Specifications," IEEE Standard for Information technology—Telecommunications and information exchange between systems Local and metropolitan area networks—Specific requirements, Dec. 3, 2020, 4379 pages.

(Continued)

*Primary Examiner* — Adolf Dsouza
(74) *Attorney, Agent, or Firm* — Nicholson, De Vos Webster & Elliott, LLP

(57) ABSTRACT

A method performed by a station (STA) to seamlessly roam from a first access point (AP) to a second AP. The method includes transmitting a roaming request frame to the first AP and the second AP in a second channel, receiving a roaming confirmation frame from the second AP in the second channel, transmitting a roaming initiation frame to the first AP and the second AP in the second channel in response to receiving the roaming confirmation frame; receiving a data frame from the second AP in a first channel, wherein the third data frame includes buffered data for the STA that was buffered at the first AP and relayed by the first AP to the second AP, and transmitting an acknowledgement (ACK) frame that acknowledges the third data frame to the second AP in the first channel.

20 Claims, 12 Drawing Sheets

(56) References Cited

OTHER PUBLICATIONS

IEEE 802. 11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.
IEEE 802. 11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.
IEEE 802.11ax-2021: "Part 11: Wireless LAN Medium Access Control (MAC) and Physical Layer (PHY) Specifications, Amendment 1: Enhancements for High-Efficiency WLAN," IEEE Standard for Information technology—Telecommunications and information exchange between systems Local and metropolitan area networks—Specific requirements, published 2021, 767 pages.
IEEE 802. 11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.
IEEE 802.11bd-2022: "Part 11: Wireless LAN Medium Access Control (MAC) and Physical Layer (PHY) Specifications, Amendment 5: Enhancements for Next Generation V2X," IEEE Standard for Information technology—Telecommunications and information exchange between systems Local and metropolitan area networks—Specific requirements, published Mar. 10, 2023, 144 pages.
IEEE 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.
IEEE 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
IEEE 802.11p-2010, "IEEE Standard for Information technology—Telecommunications and information exchange between systems—Local and metropolitan area networks—Specific Requirements", Part 11: Wireless LAN Medium Access Control (MAC) and Physical Layer (PHY) Specifications , "Amendment 6: Wireless Access in Vehicular Environments", Jul. 15, 2010, 51 pages.
IEEE P802.11be/D3.0: "Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)," Jan. 2023, 999 pages.

* cited by examiner

600

| | MAXIMUM PHY RATE | PHY RATE ENHANCEMENT | BANDWIDTH/NUMBER OF SPATIAL STREAMS | OPERATING BANDS |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

700

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 µs | - | - | equivalent to 1,250 kHz |
| LEGACY-LONG TRAINING FIELD (L-LTF) 714 | NON-HT LONG TRAINING FIELD (LTF) | 8 µs | 3.2 µs | 1.6 µs | 312.5 kHz |
| LEGACY-SIGNAL FIELD (L-SIG) 716 | NON-HT SIGNAL FIELD | 4 µs | 3.2 µs | 0.8 µs | 312.5 kHz |
| RL-SIG FIELD 718 | REPEATED NON-HT SIGNAL FIELD | 4 µs | 3.2 µs | 0.8 µs | 312.5 kHz |
| U-SIG FIELD 720 | UNIVERSAL SIGNAL FIELD | $N_{USIG}$ * 4 µs | 3.2 µs | 0.8 µs | 312.5 kHz |
| EHT-SIG FIELD 722 | EHT SIGNAL FIELD | $N_{EHESIG}$ * 4 µs | 3.2 µs | 0.8 µs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF}$ * (DTF period + GI) µs | 2xLTF: 6.4 µs<br>4xLTF: 12.8 µs | 0.8, 1.6, or 3.2 µs | 2xLTF: (equivalent to) 156.25 kHz;<br>4xLTF: 78.125 kHz |
| EHT-DATA FIELD 730 | EHT DATA FIELD | $N_{DATA}$ * (DTF period + GI) µs | 12.8 µs | 0.8, 1.6, or 3.2 µs | 78.125 kHz |
| EHT-MA FIELD 732 | EHT MIDAMBLE FIELD | - | - | - | - |

FIG. 7

SEAMLESS ROAMING MECHANISM FOR WIRELESS NETWORKS

CROSS-REFERENCE TO RELATED APPLICATION

This application claims the benefit of U.S. Provisional Application No. 63/511,777, filed Jul. 3, 2023, titled, "Seamless roaming mechanism for beyond IEEE 802.11be networks," which is hereby incorporated by reference.

TECHNICAL FIELD

The present disclosure generally relates to wireless communications, and more specifically, relates to seamless roaming of a station (STA) between access points (APs).

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

As a STA moves around geographically, it may disconnect from one AP and connect to another AP (and thus change the basic service set (BSS) to which it belongs). With existing IEEE 802.11 wireless networking standards, when a STA disconnects from a first AP and connects to a second AP (which may also be referred to as "roaming"), any data buffered at the first AP for the STA may be lost (not delivered to the STA). Thus, a seamless data transfer is not possible in a scenario where a STA roams between APs.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

DETAILED DESCRIPTION

Figure 1:
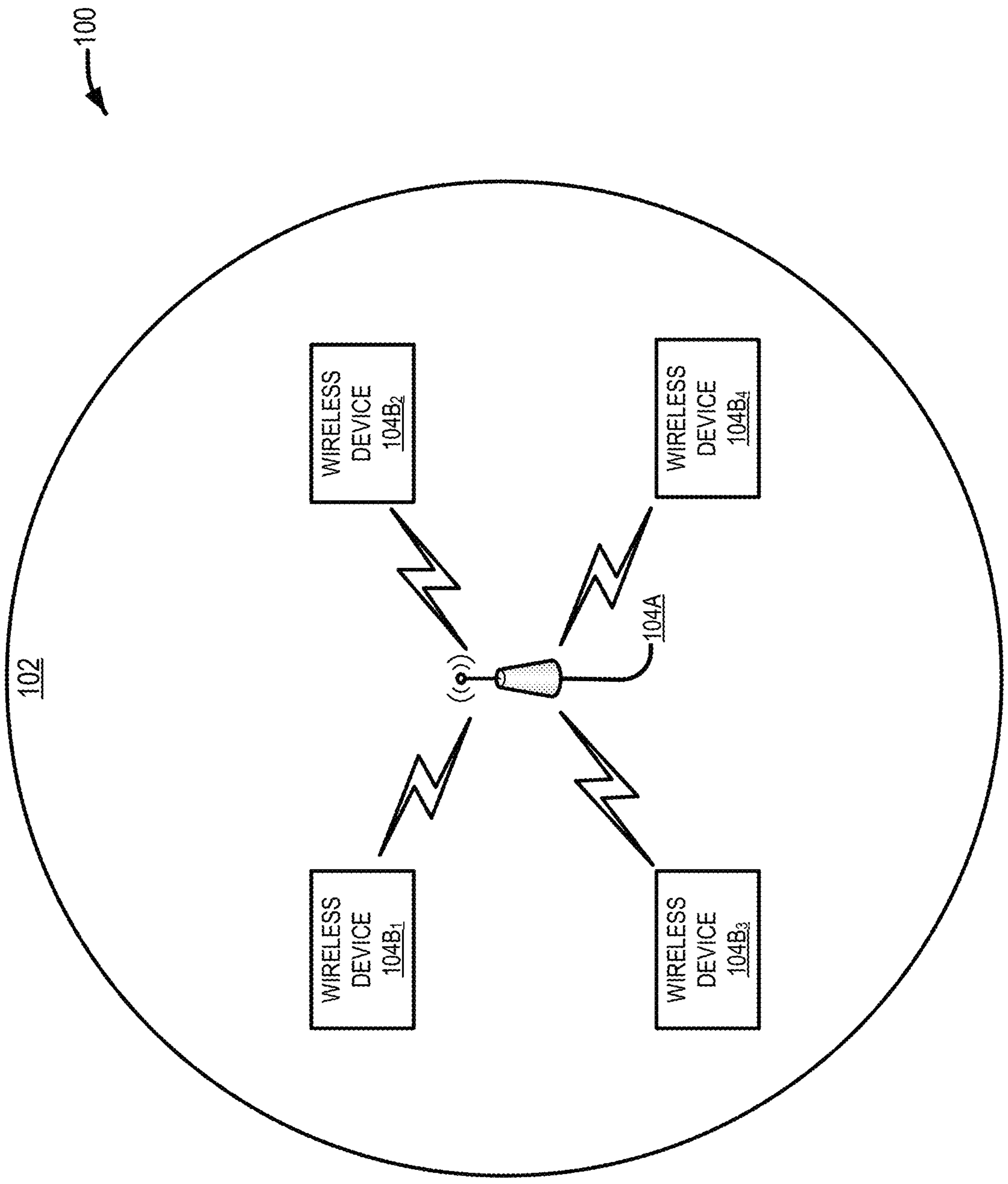
FIG. 1 illustrates an example wireless local area network (WLAN) with a basic service set (BSS) that includes a plurality of wireless devices, in accordance with some embodiments of the present disclosure.

One aspect of the present disclosure generally relates to wireless communications, and more specifically, relates to seamless roaming of a station (STA) between access points (APs).

As mentioned above, with existing Institute of Electrical and Electronics Engineers (IEEE) IEEE 802.11 wireless networking standards, a seamless data transfer is not possible in a scenario where a STA roams between APs. Embodiments are disclosed herein that leverage multilink operations in two different channels to allow a STA to seamlessly roam between APs without loss of data. According to some embodiments, a STA may request seamless roaming when it is about to disconnect from one AP and connect to another AP. Responsive to receiving such request, the original AP may transmit data buffered for the STA in the original AP's queue to the new AP. When the STA connects to the new AP, the new AP may transmit the data that it received from the original AP to the STA.

According to some embodiments, a first AP may wirelessly transmit a first data frame to a STA in a first channel. The STA may wirelessly transmit a first acknowledgment (ACK) frame that acknowledges the first data frame to the first AP in the first channel. The STA may also wirelessly transmit a roaming request frame to the first AP and a second AP in a second channel. The first AP may wirelessly transmit a second data frame to the STA in the first channel. The second AP may wirelessly transmit a roaming confirmation frame to the STA in the second channel in response to receiving the roaming request frame. The STA may wirelessly transmit a second ACK frame that acknowledges the second data frame to the first AP in the first channel. The STA may wirelessly transmit a roaming initiation frame to the first AP and the second AP in the second channel in response to receiving the roaming confirmation frame. The first AP may wirelessly transmit a third data frame to the STA in the first channel. The first AP may also wirelessly transmit a roaming data frame to the second AP in the second channel, wherein the roaming data frame includes buffered data for the STA (which was buffered at the first AP). The STA may wirelessly transmit a third ACK frame that acknowledges the third data frame to the first AP in the first channel. The second AP may transmit a fourth ACK frame that acknowledges the roaming data frame to the first AP in the second channel. The second AP may wirelessly transmit a fourth data frame to the STA in the first channel, wherein the fourth data frame includes the buffered data for the STA (which the second AP received from the first AP in the roaming data frame). The STA may transmit a fifth ACK frame that acknowledges the fourth data frame to the second AP in the first channel. In this way, the STA may roam from the first AP to the second AP without loss of data.

For purposes of illustration, various embodiments are described herein in the context of wireless networks that are based on IEEE 802.11 standards and using terminology and concepts thereof. Those skilled in the art will appreciate that the embodiments disclosed herein can be modified/adapted for use in other types of wireless networks.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104$B_1$-104$B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104$B_1$-104$B_4$) may be collectively referred to as STAs. However, for case of description, only the non-AP STAs may be referred to as STAs. Although shown with four non-AP STAs (e.g., the wireless devices 104$B_1$-104$B_4$), the WLAN 100 may include any number of non-AP STAs (e.g., one or more wireless devices 104B).

Figure 2:
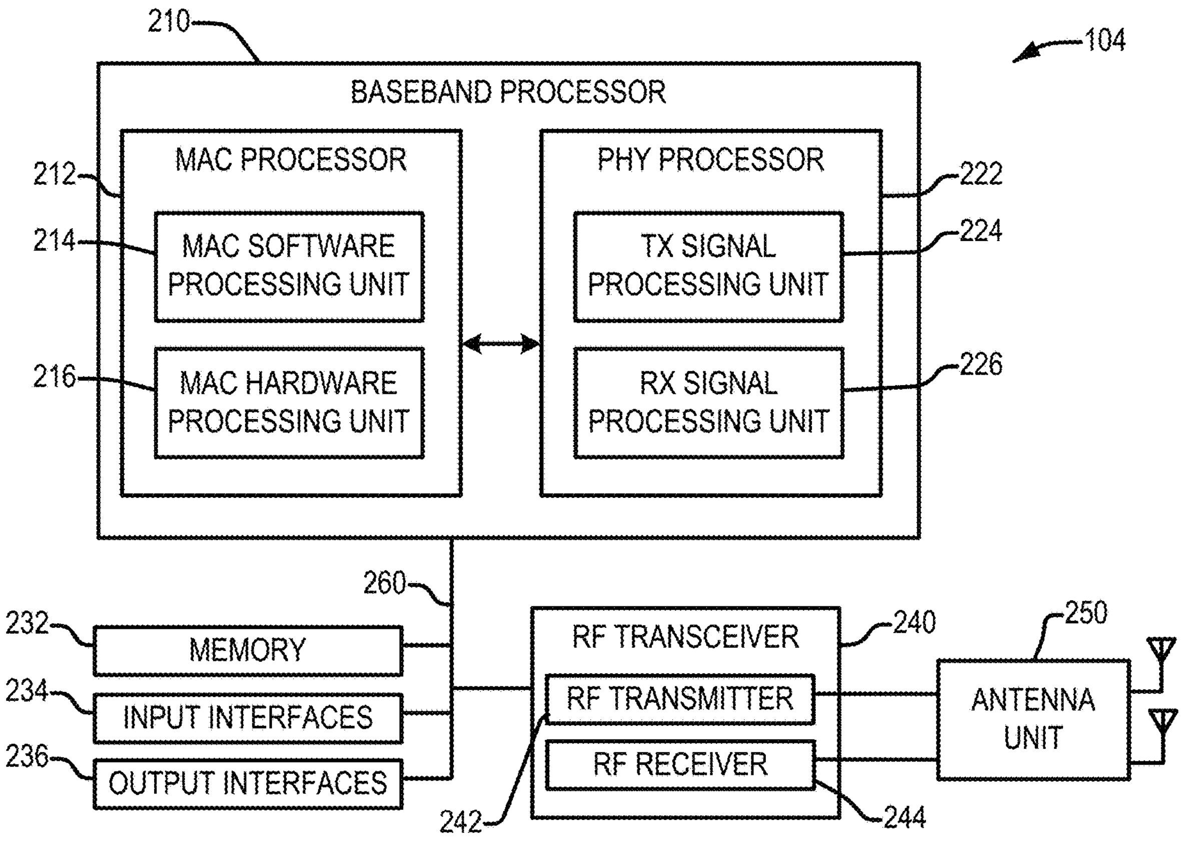
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104$B_1$-104$B_4$ in FIG. 1. The wireless device 104 includes a baseband processor 210, a radio frequency (RF) transceiver 240, an antenna unit 250, a storage device (e.g., memory device) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi- User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
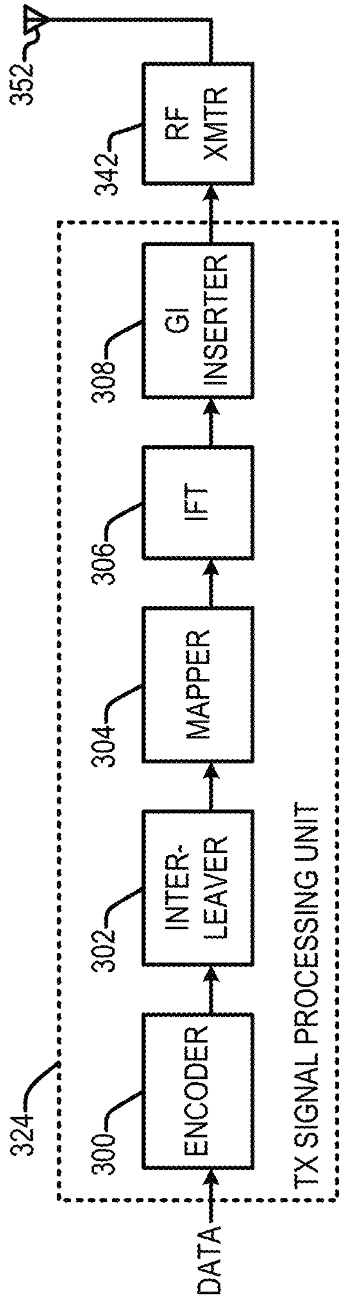
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0 s or 1 s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
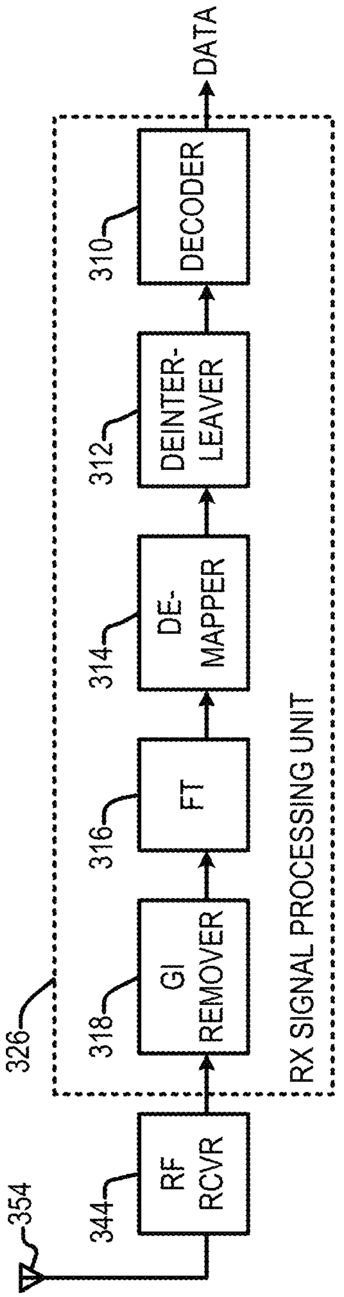
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
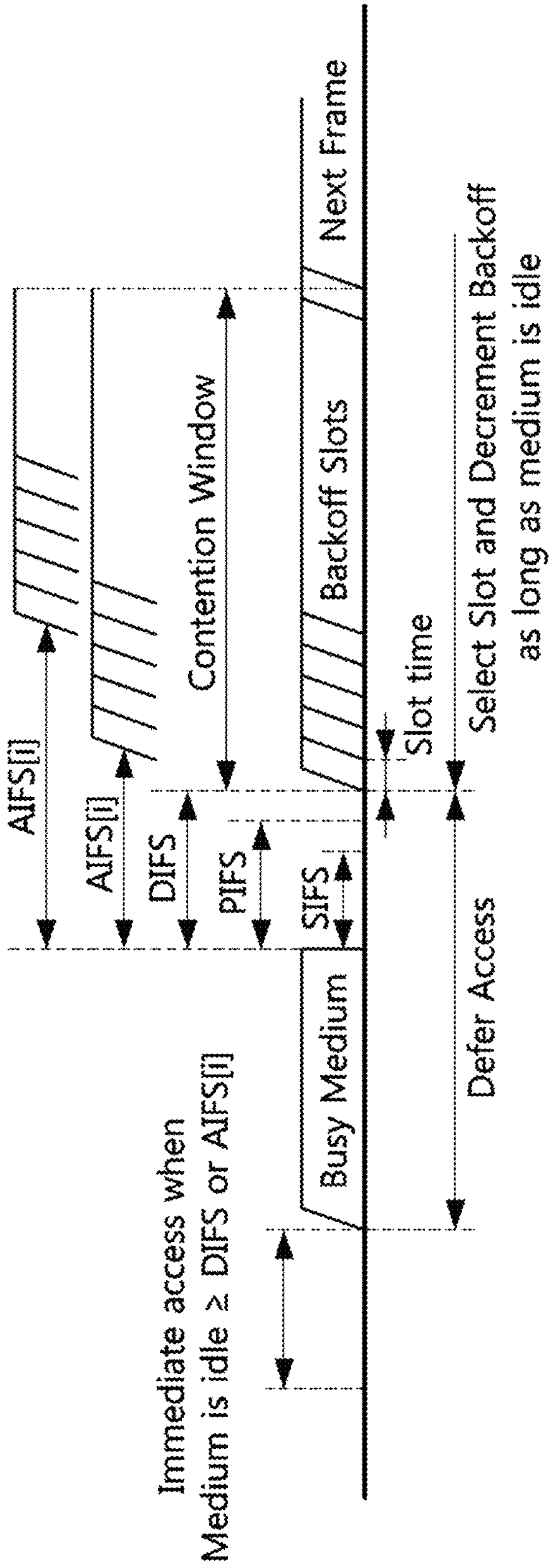
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QOS) functionality (that is, a QOS STA) may transmit the frame after performing backoff if an AIFS for an associated access category (AC) (i.e., AIFS[AC]) has elapsed. When transmitted by the QOS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
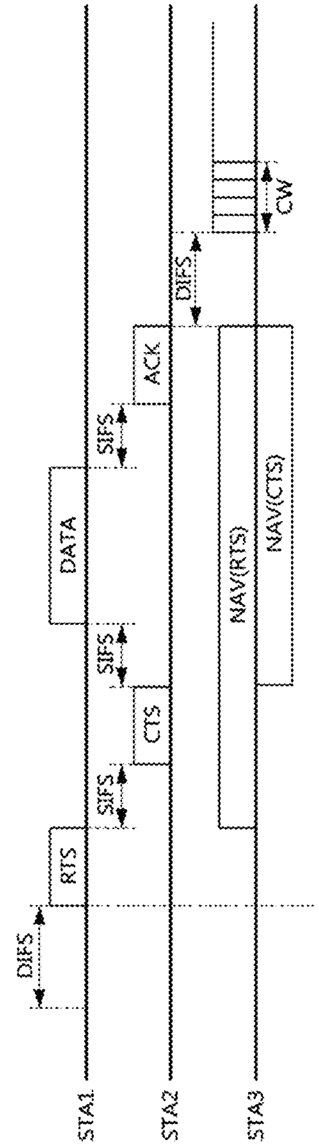
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 docs not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink (UL)/downlink (DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HARQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP cooperation has been discussed as a possible technology to be adopted in IEEE 802.11be, where there is high level classification depending on various AP cooperation schemes. For example, there is a first type of cooperation scheme in which data for a user is sent from a single AP (sometimes referred to as "coordinated") and there is a second type of cooperation scheme in which data for a user is sent from multiple APs (sometimes referred to as "joint").

For the coordinated scheme, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. For the joint scheme, multiple APs are transmitting jointly to a given user.

Figure 8:
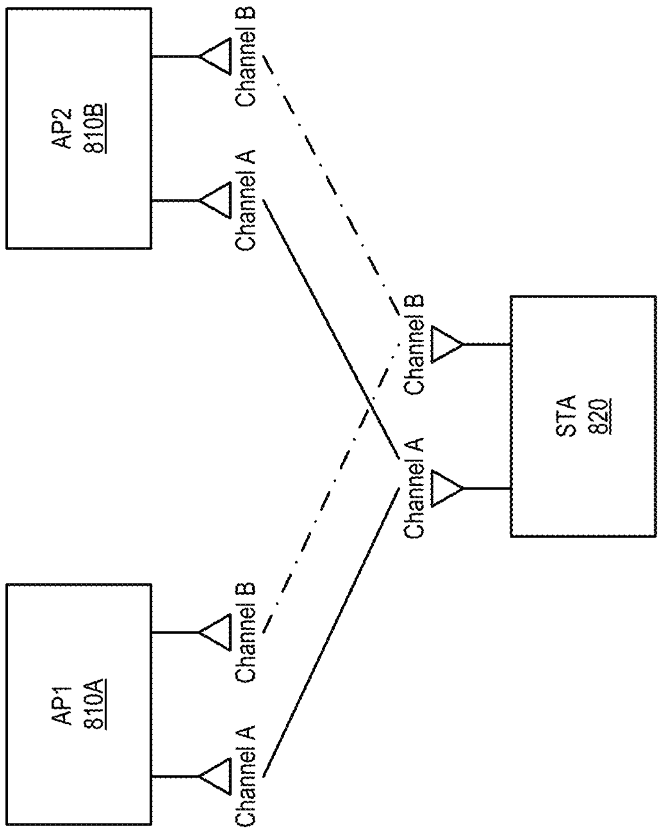
FIG. 8 is a diagram showing a network environment in which a STA may seamlessly roam between APs, according to some embodiments.

FIG. 8 is a diagram showing a network environment in which a STA may seamlessly roam between APs, according to some embodiments.

As shown in the diagram, the network environment includes a first AP (AP1) 810A, a second AP (AP2) 810B, and a STA 820. In this example, AP1 810A, AP2 810B, and the STA 820 are capable of performing multilink operations in channel A and channel B. Channel A and channel B may be different channels usable in a wireless network. The channel bandwidths of channel A and channel B may be the same or different. AP1 810A may serve a first basic service set (BSS1) and AP2 810B may serve a second BSS (BSS2). The STA 820 may be initially be served by AP1 810 in channel A and be a member of BSS1. At this time, channel B may be unused. As will be described in additional detail herein, channel B may later be used for transmitting control frames for implementing a seamless roaming process.

As the STA 820 moves further away from AP1 810A and moves closer to AP2 810B, the channel quality between the STA 820 and AP1 810A may worsen and the channel quality between the STA 820 and AP2 810B may improve. For better quality of service, the STA 820 may decide to leave BSS1 (disconnect from AP1 810A) and join BSS2 (connect to AP2 810B). At this time, AP1 810A may have buffered data for the STA 820 in its queue (e.g., data that AP1 810A intends to transmit to the STA 820 but has not transmitted to the STA 820 yet). Embodiments provide a mechanism for AP1 810A to provide buffered data for the STA 820 to AP2 810B so that AP2 810B can deliver such data to the STA 820 after the STA 820 connects to AP 2 810B. AP1 810A may provide buffered data for the STA 820 to AP2 810B in channel B (e.g., directly delivered from AP1 810A to AP2 810B or through an intermediary). Also, embodiments make use of new control frames (e.g., roaming request frame, roaming confirmation frame, roaming initiation frame, etc.) to implement seamless roaming of the STA 820 from AP1 810A to AP2 810B.

Figure 9:
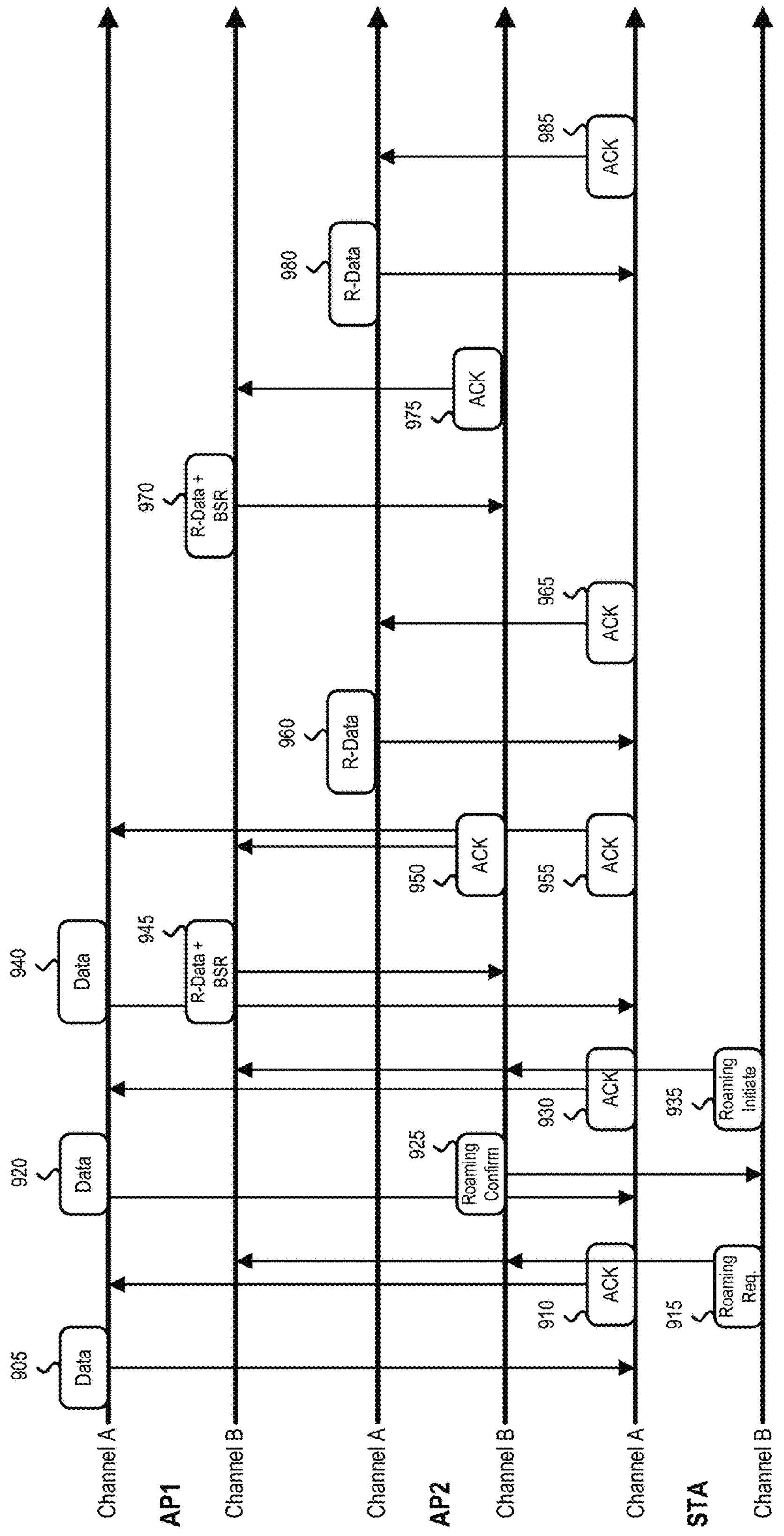
FIG. 9 is a diagram showing a frame exchange sequence for implementing seamless roaming of a STA between APs, according to some embodiments.

FIG. 9 is a diagram showing a frame exchange sequence for implementing seamless roaming of a STA between APs, according to some embodiments. The frame exchange sequence is described in the context of a network environment that includes a first AP (AP1), a second AP (AP2), and a STA that roams from AP1 to AP2.

As shown in the diagram, the AP1 may wirelessly transmit data frame 905 to the STA in channel A because the STA is initially associated with AP1 (the STA is a member of the BSS served by AP1). The STA may transmit ACK frame 910 that acknowledges data frame 905 to AP1 in channel A. The STA may decide to initiate a seamless roaming process if the channel quality between the STA and AP1 worsens and the channel quality between the STA and AP2 improves. The STA may use any suitable criteria to determine when to initiate the seamless roaming process.

The STA may initiate the seamless roaming process by transmitting roaming request frame 915 to AP1 and AP2 in channel B simultaneously. A roaming request frame may be a type of control frame that is used for requesting roaming. In an embodiment, a control subfield of an aggregated control (A-control) subfield is used to indicate that a frame is a roaming request frame (e.g., the control ID subfield of the control subfield can be set to one of the reserved control ID values (e.g., control ID values 10-14) to indicate that a frame is a roaming request frame). Roaming request frame 915 may include an address/identifier of AP1 and an address/identifier of AP2 (e.g., BSS IDs of AP1 and AP2). In an embodiment, the contents of ACK frame 910 and the contents of roaming request frame 915 are combined into a single combined frame (e.g., which may be called an "ACK+roaming request" frame). The STA may transmit such combined frame in both channel A and channel B (e.g., the combined frame may be duplicated in channel A and channel B (e.g., copied and phase-shifted if necessary)). Such duplication of the combined frame across multiple channels may allow AP1 and AP2 to more reliably receive and recover the contents of the combined frame.

Subsequently, AP1 may transmit another data frame 920 to the STA in channel A and AP2 may transmit roaming confirmation frame 925 to the STA in channel B. A roaming confirmation frame may be a type of control frame that is used for confirming a request for roaming. In an embodiment, a control subfield of an A-control subfield is used to indicate that a frame is a roaming confirmation frame (e.g., the control ID subfield of the control subfield can be set to one of the reserved control ID values (e.g., control ID values 10-14) to indicate that a frame is a roaming confirmation frame). After the STA receives data frame 920 and roaming confirmation frame 925, the STA may transmit ACK frame 930 that acknowledges data frame 920 to AP1 in channel A and transmit roaming initiate frame 935 to AP1 and AP2 in channel B. A roaming initiation frame may be a type of control frame that is used for initiating roaming. In an embodiment, a control subfield of an A-control subfield is used to indicate that a frame is a roaming initiation frame (e.g., the control ID subfield of the control subfield can be set to one of the reserved control ID values (e.g., control ID values 10-14) to indicate that a frame is a roaming initiation frame). In an embodiment, the contents of ACK frame 930 and roaming initiate frame 935 are combined into a single combined frame (e.g., which may be called an "ACK+ roaming initiation" frame) similar to how the contents of ACK frame 910 and roaming request frame 915 can be combined, as described above. The STA may transmit such combined frame in both channel A and channel B. Such duplication of the combined frame across multiple channels may allow AP1 and AP2 to more reliably receive and recover the contents of the combined frame. Once AP1 and AP2 receive roaming initiate frame 935, they may initiate the seamless roaming process on their side. It is noted that the STA is still connected to AP1 at this point.

Subsequently, AP1 may transmit another data frame 940 to the STA in channel A and also transmit roaming data frame 945 (R-Data) to AP2 in channel B. A roaming data frame may be a type of data frame that is used for relaying buffered data to a roaming STA. Roaming data frame 945 may include buffered data for the STA that was buffered at AP1 (and not yet transmitted to the STA). In an embodiment, roaming data frame 945 also includes a buffer status report (BSR) for the STA that includes information regarding further buffered data for the STA that is buffered at AP1. In this example, it is assumed that there exists further buffered data for the STA at AP1. In an embodiment, the transmissions of data frame 940 and roaming data frame 945 are aligned (e.g., the beginning and/or the end of the transmissions are aligned). The STA may transmit ACK frame 955 that acknowledges data frame 940 to AP1 in channel A if the STA successfully receives data frame 940. AP2 may transmit ACK frame 950 that acknowledges roaming data frame 945 to AP1 in channel B if AP2 successfully receives roaming data frame 945.

After the STA connects to AP2, AP2 may transmit data frame 960 that includes the buffered data for the STA (which it received from AP1 in roaming data frame 945) to the STA in channel A. Data frame 960 may be considered to be a roaming data frame (R-Data) since it includes buffered data. The STA may transmit ACK frame 965 that acknowledges data frame 960 to AP2 in channel A. As mentioned above, it is assumed in this example that there exists further buffered data for the STA at AP1. Thus, AP1 may transmit another roaming data frame 970 to AP2 in channel B. This roaming data frame 970 may include further buffered data for the STA that was buffered at AP1. Roaming data frame 970 may also include a BSR for the STA that includes information regarding further buffered data for the STA that is buffered at AP1. AP2 may transmit ACK frame 975 that acknowledges roaming data frame 970 to AP1 in channel B. AP2 may then transmit data frame 980 that includes the further buffered data (which it received from AP1 in roaming data frame 970) to the STA in channel A. Data frame 980 may be considered to be a roaming data frame (R-Data) since it includes buffered data. The STA may transmit ACK frame 985 that acknowledges data frame 980 to AP2 in channel A.

In this manner, the STA may seamlessly roam from AP1 to AP2 without losing any data that was buffered at the AP1 side.

While a particular frame exchange sequence is shown in the diagram, it should be appreciated that the sequence can be modified without departing from the spirit of the present disclosure. For example, AP1 may sequentially transmit multiple roaming data frames to AP2 in channel B without having to receive an ACK frame after each roaming data frame (e.g., by using a block ACK scheme) and all buffered data for the STA in AP1's queue may be transmitted to AP2 before AP2 transmits the buffered data to the STA. In an embodiment, the transmission of data frame 905, ACK frame 910, data frame 920, ACK frame 930, data frame 940, and/or ACK frame 955 can be omitted (or be optional), although transmitting such frames can improve channel utilization efficiency by allowing data to be transmitted concurrently with control frames.

Figure 10:
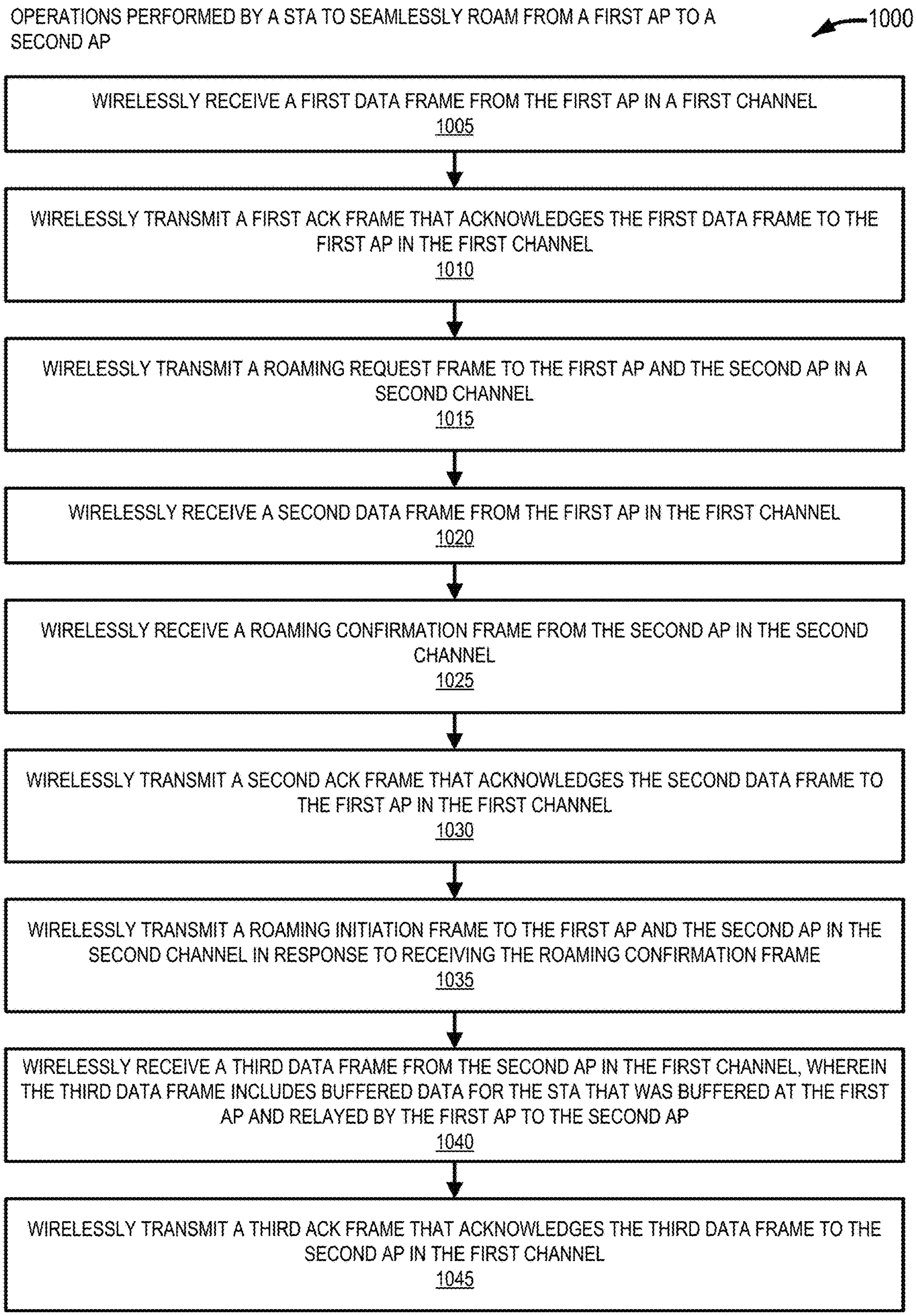
FIG. 10 is a flow diagram showing a method for seamlessly roaming between APs, according to some embodiments.

Turning now to FIG. 10, a method 1000 will be described for seamlessly roaming between APs, in accordance with an example embodiment. The method 1000 may be performed by a STA (e.g., STA 820 shown in FIG. 8). The STA may be implemented by one or more devices described herein such as wireless device 104.

Additionally, although shown in a particular order, in some embodiments the operations of the method 1000 (and the other methods shown in the other figures) may be performed in a different order. For example, although the operations of the method 1000 are shown in a sequential order, some of the operations may be performed in partially or entirely overlapping time periods.

In an embodiment, at operation 1005, the STA wirelessly receives a first data frame from a first AP in a first channel.

At operation 1010, the STA wirelessly transmits a first ACK frame that acknowledges the first data frame to the first AP in the first channel.

At operation 1015, the STA wirelessly transmits a roaming request frame to the first AP and a second AP in a second channel. In an embodiment, the roaming request frame includes an address of the first AP and an address of the second AP. In an embodiment, the first ACK frame and the roaming request frame are combined into a combined frame and the combined frame is separately transmitted in the first channel and the second channel.

At operation 1020, the STA wirelessly receives a second data frame from the first AP in the first channel.

At operation 1025, the STA wirelessly receives a roaming confirmation frame from the second AP in the second channel.

At operation 1030, the STA wirelessly transmits a second ACK frame that acknowledges the second data frame to the first AP in the first channel.

At operation 1035, the STA wirelessly transmits a roaming initiation frame to the first AP and the second AP in the second channel in response to receiving the roaming confirmation frame. In an embodiment, the second ACK frame and the roaming initiation frame are combined into a combined frame and the combined frame is separately transmitted in the first channel and the second channel.

At operation 1040, the STA wirelessly receives a third data frame from the second AP in the first channel, wherein the third data frame includes buffered data for the STA that was buffered at the first AP and relayed by the first AP to the second AP.

At operation 1045, the STA wirelessly transmits a third ACK frame that acknowledges the third data frame to the second AP in the first channel.

In an embodiment, the STA wirelessly receives a fourth data frame from the second AP in the first channel after receiving the third data frame, wherein the fourth data frame includes further buffered data for the STA that was buffered at the first AP and relayed by the first AP to the second AP.

Figure 11:
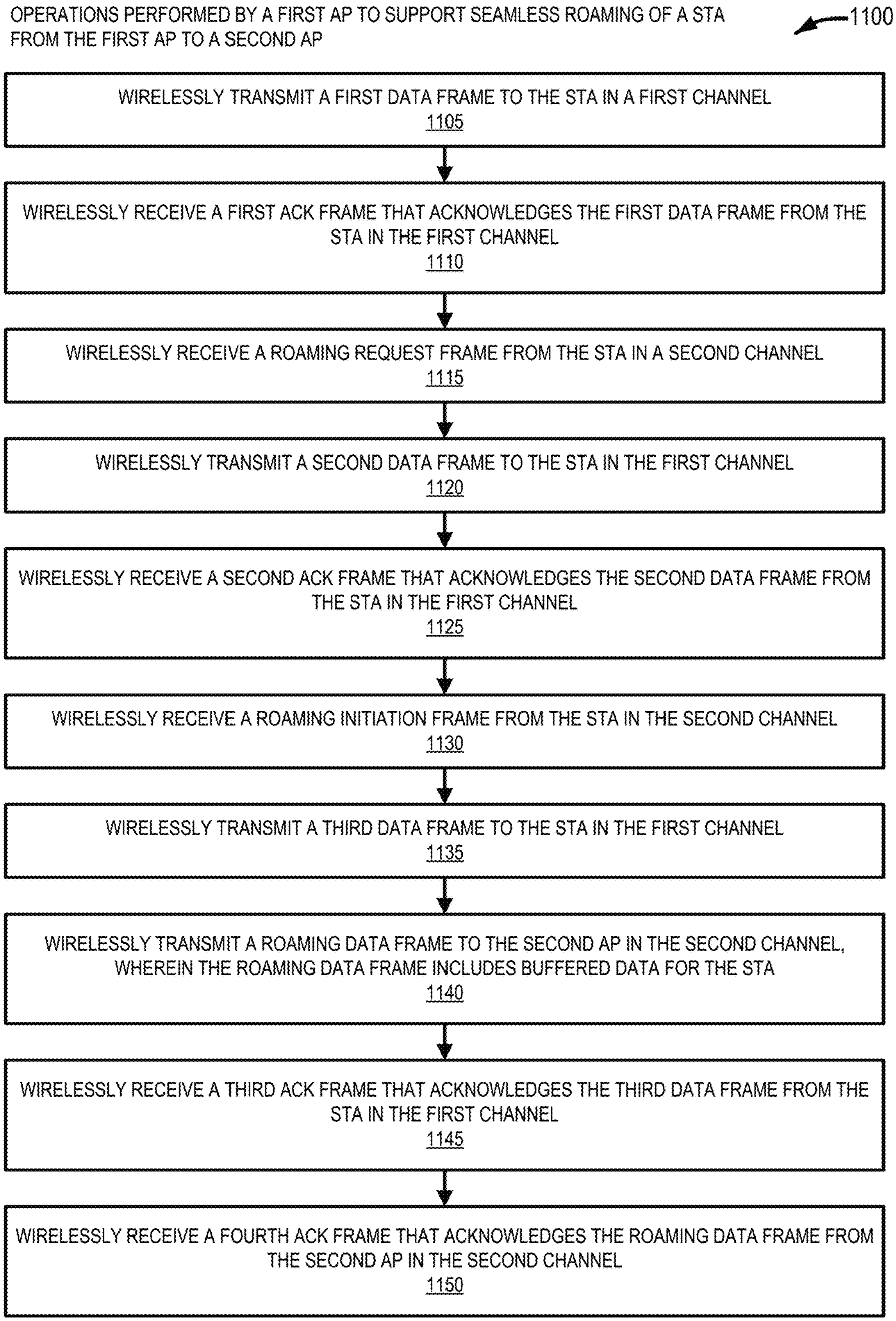
FIG. 11 is a flow diagram showing a method for supporting seamless roaming of a STA between APs, according to some embodiments.

Turning now to FIG. 11, a method 1100 will be described for supporting seamless roaming of a STA between APs, in accordance with an example embodiment. The method 1100 may be performed by the first AP (e.g., AP1 810A shown in FIG. 8). The first AP may be implemented by one or more devices described herein such as wireless device 104.

At operation 1105, the first AP wirelessly transmits a first data frame to the STA in a first channel.

At operation 1110, the first AP wirelessly receives a first ACK frame that acknowledges the first data frame from the STA in the first channel.

At operation 1115, the first AP wirelessly receives a roaming request frame from the STA in a second channel. In an embodiment, the roaming request frame includes an address of the second AP. In an embodiment, the first ACK frame and the roaming request frame are combined into a combined frame that is separately received in the first channel and the second channel.

At operation 1120, the first AP wirelessly transmits a second data frame to the STA in the first channel.

At operation 1125, the first AP wirelessly receives a second ACK frame that acknowledges the second data frame from the STA in the first channel.

At operation 1130, the first AP wirelessly receives a roaming initiation frame from the STA in the second channel. In an embodiment, the second ACK frame and the roaming initiation frame are combined into a combined frame that is separately received in the first channel and the second channel.

At operation 1135, the first AP wirelessly transmits a third data frame to the STA in the first channel.

At operation 1140, the first AP wirelessly transmits a roaming data frame to the second AP in the second channel, wherein the roaming data frame includes buffered data for the STA (data buffered at the first AP for the STA). In an embodiment, the roaming data frame further includes a buffer status report for the STA that includes information regarding further buffered data for the STA that is buffered at the first AP. In an embodiment, the third data frame and the roaming data frame are aligned.

At operation 1145, the first AP wirelessly receives a third ACK frame that acknowledges the third data frame from the STA in the first channel.

At operation 1150, the first AP wirelessly receives a fourth ACK frame that acknowledges the roaming data frame from the second AP in the second channel.

In an embodiment, the first AP wirelessly transmits a further roaming data frame to the second AP in the second channel, wherein the further roaming data frame includes further buffered data for the STA. The first AP may then wirelessly receive a fifth ACK frame that acknowledges the further roaming data frame from the second AP in the second channel.

Figure 12:
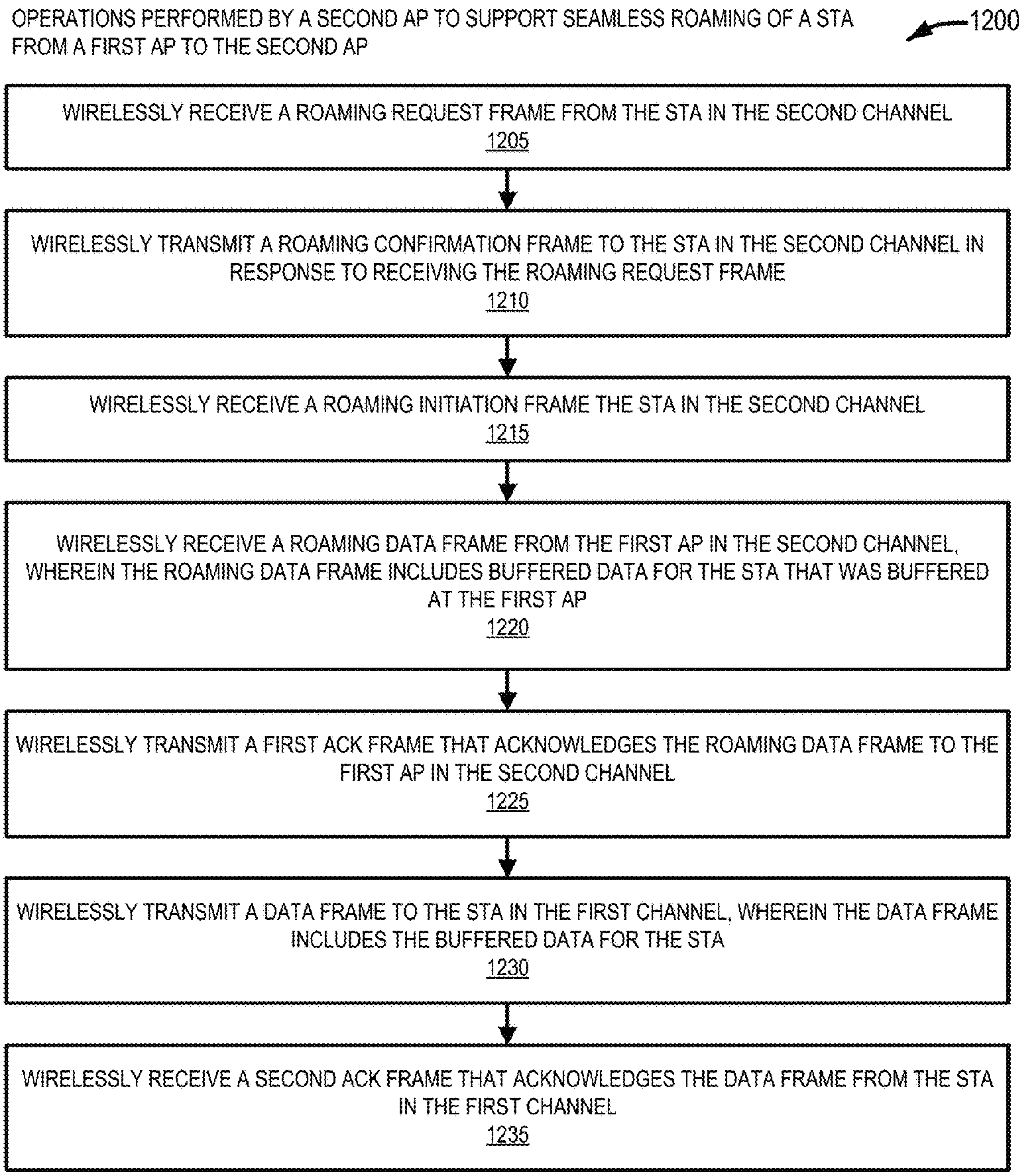
FIG. 12 is a flow diagram showing a method for supporting seamless roaming of a STA between APs, according to some embodiments.

Turning now to FIG. 12, a method 1200 will be described for supporting seamless roaming of a STA between APs, in accordance with an example embodiment. The method 1100 may be performed by the second AP (e.g., AP2 810B shown in FIG. 8). The second AP may be implemented by one or more devices described herein such as wireless device 104.

At operation 1205, the second AP wirelessly receives a roaming request frame from the STA in a second channel. In an embodiment, the roaming request frame includes an address of the first AP. In an embodiment, the roaming request frame is included in a combined frame that also includes an ACK frame intended for the first AP, wherein the combined frame is separately received from the STA in the first channel and the second channel.

At operation 1210, the second AP wirelessly transmits a roaming confirmation frame to the STA in the second channel in response to receiving the roaming request frame.

At operation 1215, the second AP wirelessly receives a roaming initiation frame form the STA in the second channel. In an embodiment, the roaming initiation frame is included in a combined frame that also includes an ACK frame intended for the first AP, wherein the combined frame is separately received in the first channel and the second channel.

At operation 1220, the second AP wirelessly receives a roaming data frame from the first AP in the second channel, wherein the roaming data frame includes buffered data for the STA that was buffered at the first AP. In an embodiment, the roaming data frame further includes a buffer status report for the STA that includes information regarding further buffered data for the STA that is buffered at the first AP.

At operation 1225, the second AP wirelessly transmits a first ACK frame that acknowledges the roaming data frame to the first AP in the second channel.

At operation 1230, the second AP wirelessly transmits a data frame to the STA in the first channel, wherein the data frame includes the buffered data for the STA.

At operation 1235, the second AP wirelessly receives a second ACK frame that acknowledges the data frame from the STA in the first channel.

In an embodiment, the second AP wirelessly receives a further roaming data frame from the first AP in the second channel, wherein the further roaming data frame includes further buffered data for the STA that was buffered at the first AP. The second AP may then wirelessly transmit a third ACK frame that acknowledges the second roaming data frame to the first AP in the second channel. The second AP may then wirelessly transmit a further data frame to the STA in the first channel, wherein the further data frame includes the further buffered data for the STA. The second AP may then wirelessly receive a fourth ACK frame that acknowledges the further data frame from the STA in the first channel.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a station (STA) implemented by a wireless device to seamlessly roam from a first access point (AP) to a second AP, the method comprising:
wirelessly receiving a first data frame from the first AP in a first channel;
wirelessly transmitting a first acknowledgement (ACK) frame that acknowledges the first data frame to the first AP in the first channel;
wirelessly transmitting a roaming request frame to the first AP and the second AP in a second channel;
wirelessly receiving a second data frame from the first AP in the first channel;
wirelessly receiving a roaming confirmation frame from the second AP in the second channel;
wirelessly transmitting a second ACK frame that acknowledges the second data frame to the first AP in the first channel;
wirelessly transmitting a roaming initiation frame to the first AP and the second AP in the second channel in response to receiving the roaming confirmation frame;
wirelessly receiving a third data frame from the second AP in the first channel, wherein the third data frame includes buffered data for the STA that was buffered at the first AP and relayed by the first AP to the second AP; and
wirelessly transmitting a third ACK frame that acknowledges the third data frame to the second AP in the first channel.

2. The method of claim 1, wherein the roaming request frame includes an address of the first AP and an address of the second AP.

3. The method of claim 1, wherein the first ACK frame and the roaming request frame are combined into a combined frame and the combined frame is separately transmitted in the first channel and the second channel.

4. The method of claim 1, wherein the second ACK frame and the roaming initiation frame are combined into a combined frame and the combined frame is separately transmitted in the first channel and the second channel.

5. The method of claim 1, further comprising:
wirelessly receiving a fourth data frame from the second AP in the first channel after receiving the third data frame, wherein the fourth data frame includes further buffered data for the STA that was buffered at the first AP and relayed by the first AP to the second AP.

6. A method performed by a first access point (AP) implemented by a wireless device to support seamless roaming of a station (STA) from the first AP to a second AP, the method comprising:
wirelessly transmitting a first data frame to the STA in a first channel;
wirelessly receiving a first acknowledgement (ACK) frame that acknowledges the first data frame from the STA in the first channel;
wirelessly receiving a roaming request frame from the STA in a second channel;
wirelessly transmitting a second data frame to the STA in the first channel;
wirelessly receiving a second ACK frame that acknowledges the second data frame from the STA in the first channel;
wirelessly receiving a roaming initiation frame the STA in the second channel;
wirelessly transmitting a third data frame to the STA in the first channel;
wirelessly transmitting a roaming data frame to the second AP in the second channel, wherein the roaming data frame includes buffered data for the STA;
wirelessly receiving a third ACK frame that acknowledges the third data frame from the STA in the first channel; and
wirelessly receiving a fourth ACK frame that acknowledges the roaming data frame from the second AP in the second channel.

7. The method of claim 6, wherein the roaming request frame includes an address of the second AP.

8. The method of claim 6, wherein the first ACK frame and the roaming request frame are combined into a combined frame that is separately received in the first channel and the second channel.

9. The method of claim 6, wherein the second ACK frame and the roaming initiation frame are combined into a combined frame that is separately received in the first channel and the second channel.

10. The method of claim 6, wherein the roaming data frame further includes a buffer status report for the STA that includes information regarding further buffered data for the STA that is buffered at the first AP.

11. The method of claim 6, wherein the third data frame and the roaming data frame are aligned.

12. The method of claim 6, further comprising:
wirelessly transmitting a further roaming data frame to the second AP in the second channel, wherein the further roaming data frame includes further buffered data for the STA; and
wirelessly receiving a fifth ACK frame that acknowledges the further roaming data frame from the second AP in the second channel.

13. A method performed by a second access point (AP) implemented by a wireless device to support seamless roaming of a station (STA) from a first AP to the second AP, wherein the first AP and the second AP operate in a first channel and a second channel, the method comprising:
wirelessly receiving a roaming request frame from the STA in the second channel;
wirelessly transmitting a roaming confirmation frame to the STA in the second channel in response to receiving the roaming request frame;
wirelessly receiving a roaming initiation frame the STA in the second channel;
wirelessly receiving a roaming data frame from the first AP in the second channel, wherein the roaming data frame includes buffered data for the STA that was buffered at the first AP;
wirelessly transmitting a first acknowledgement (ACK) frame that acknowledges the roaming data frame to the first AP in the second channel;
wirelessly transmitting a data frame to the STA in the first channel, wherein the data frame includes the buffered data for the STA; and
wirelessly receiving a second ACK frame that acknowledges the data frame from the STA in the first channel.

14. The method of claim 13, wherein the roaming request frame includes an address of the first AP.

15. The method of claim 13, wherein the roaming request frame is included in a combined frame that also includes an ACK frame intended for the first AP, wherein the combined frame is separately received from the STA in the first channel and the second channel.

16. The method of claim 13, wherein the roaming initiation frame is included in a combined frame that also includes an ACK frame intended for the first AP, wherein the combined frame is separately received in the first channel and the second channel.

17. The method of claim 13, wherein the roaming data frame further includes a buffer status report for the STA that includes information regarding further buffered data for the STA that is buffered at the first AP.

18. The method of claim 13, further comprising:

wirelessly receiving a further roaming data frame from the first AP in the second channel, wherein the further roaming data frame includes further buffered data for the STA that was buffered at the first AP;

wirelessly transmitting a third ACK frame that acknowledges the further roaming data frame to the first AP in the second channel;

wirelessly transmitting a further data frame to the STA in the first channel, wherein the further data frame includes the further buffered data for the STA; and wirelessly receiving a fourth ACK frame that acknowledges the further data frame from the STA in the first channel.

19. A wireless device to implement a station (STA) in a wireless network, the wireless device comprising:

a radio frequency transceiver;

a memory device storing a set of instructions; and a processor coupled to the memory device, wherein the set of instructions when executed by the processor causes the STA to:

wirelessly receive a first data frame from a first AP in a first channel;

wirelessly transmit a first acknowledgement (ACK) frame that acknowledges the first data frame to the first AP in the first channel;

wirelessly transmit a roaming request frame to the first AP and a second AP in a second channel;

wirelessly receive a second data frame from the first AP in the first channel;

wirelessly receive a roaming confirmation frame from the second AP in the second channel;

wirelessly transmit a second ACK frame that acknowledges the second data frame to the first AP in the first channel;

wirelessly transmit a roaming initiation frame to the first AP and the second AP in the second channel in response to receiving the roaming confirmation frame;

wirelessly receive a third data frame from the second AP in the first channel, wherein the third data frame includes buffered data for the STA that was buffered at the first AP and relayed by the first AP to the second AP; and wirelessly transmit a third ACK frame that acknowledges the third data frame to the second AP in the first channel.

20. The wireless device of claim 19, wherein the roaming request frame includes an address of the first AP and an address of the second AP.

* * * * *